United States Patent [19]

Piotrowski et al.

[11] Patent Number: 4,733,721
[45] Date of Patent: Mar. 29, 1988

[54] APPARATUS AND METHOD FOR HEATING A FLUID

[75] Inventors: Tadeusz Piotrowski, St. Maur, France; Rene Rothen, Aire, Switzerland

[73] Assignee: Euroburner Establishment, Vaduz, Liechtenstein

[21] Appl. No.: 652,117

[22] Filed: Sep. 19, 1984

[51] Int. Cl.$^4$ ............................................. F28D 11/02
[52] U.S. Cl. ....................................... 165/89; 122/11; 237/66
[58] Field of Search ...................... 237/8 R, 66, 56, 19; 165/89, 90, 91, 86; 122/11; 219/301

[56] References Cited

U.S. PATENT DOCUMENTS

| | | |
|---|---|---|
| 756,310 | 4/1904 | Willmann . |
| 1,914,084 | 6/1933 | Ellis et al. . |
| 1,951,560 | 3/1034 | Reavell ................................ 237/66 |
| 2,169,601 | 8/1939 | Cornelius et al. . |
| 2,588,277 | 3/1952 | Neergaard et al. . |
| 2,901,176 | 8/1959 | Hoyt ..................................... 237/66 |
| 3,231,474 | 1/1966 | Jones et al. . |
| 3,255,084 | 6/1966 | Doroszlai . |
| 3,302,701 | 2/1967 | Thomas . |
| 3,354,944 | 11/1967 | Koelle . |
| 3,382,917 | 5/1968 | Rice . |
| 3,406,741 | 10/1968 | Leach . |
| 3,495,951 | 2/1970 | Tanaka et al. . |
| 3,542,112 | 11/1970 | Monty . |
| 3,620,684 | 11/1971 | Brooks . |
| 3,667,542 | 6/1972 | Parkes . |
| 3,797,550 | 3/1974 | Latinen . |
| 3,820,590 | 6/1974 | Littman et al. . |
| 3,877,515 | 4/1975 | Laing . |
| 3,910,346 | 10/1975 | ter Braak . |
| 4,164,253 | 8/1979 | Skala . |
| 4,187,904 | 2/1980 | Kuhnlein . |
| 4,200,146 | 4/1980 | Olson . |
| 4,232,733 | 11/1980 | Piotrowski . |
| 4,281,238 | 7/1981 | Noma et al. ..................... 219/301 X |
| 4,369,918 | 1/1983 | David et al. ...................... 237/55 X |
| 4,388,915 | 6/1983 | Shafran ............................... 126/247 |
| 4,501,231 | 2/1985 | Perkins .................................. 122/26 |

FOREIGN PATENT DOCUMENTS

| | | |
|---|---|---|
| 2604130 | 2/1976 | Fed. Rep. of Germany ........ 237/66 |
| 1011684 | 6/1952 | France . |
| 1155041 | 4/1958 | France . |
| 374941 | 6/1932 | United Kingdom . |
| 392350 | 5/1933 | United Kingdom . |
| 586314 | 3/1947 | United Kingdom . |
| 655157 | 7/1951 | United Kingdom . |
| 700205 | 11/1953 | United Kingdom . |
| 728330 | 4/1955 | United Kingdom . |
| 988855 | 4/1965 | United Kingdom . |
| 1012017 | 12/1965 | United Kingdom . |
| 1204688 | 9/1970 | United Kingdom . |

OTHER PUBLICATIONS

Japan-Heating Roller for Fiber Strands, 12/15/71, Nakahara et al., 46-36431 Translation included.
Japan-Heating Roller for Synthetic Fiber Machine, 12/25/71, Uemura 46-37542 Translation included.

Primary Examiner—Henry A. Bennet
Attorney, Agent, or Firm—Sandler & Greenblum

[57] ABSTRACT

A method and apparatus for supplying a heated fluid to a heat consumption circuit, such as an injection mold. The apparatus comprises a heat exchanger, for heating the fluid, a pump for pumping the heated fluid to the heat consumption circuit, a reservoir for storing the fluid, and a degasifier for degasifying the fluid that returns from the heat consumption circuit to the apparatus. The heat exchanger, and the pump comprise one compact integral assembly. In addition, the connection between the degasifier and the reservoir is in the form of a siphon which acts as a thermal barrier to prevent the heat from the heated fluid from heating the fluid in the reservoir. As a result of this arrangement, the total volume of fluid used is much smaller than in prior art devices, thereby substantially decreasing the heat losses from the fluid to the environment.

21 Claims, 7 Drawing Figures

TOTAL    $E + R = \dfrac{5E}{4}$      e $E = 8e$      $\dfrac{E+R}{e} = 10$

APPARATUS AND METHOD FOR HEATING A FLUID

BACKGROUND OF THE INVENTION

1. Field of the Invention

The invention relates to a method and apparatus for heating a fluid, which, in turn, is used to heat an apparatus such as an injection mold.

2. Description of Background Information

The heating of equipment such as plastic injection molds, is often accomplished by use of a heat exchange fluid. This heat exchange fluid, in turn, is heated by means of a heat supply unit. The heat supply unit is generally positioned, for example, on the sides of a press adapted to be equipped with the molds. The manufacture of these heat supply units requires a number of very expensive elements which are cumbersome and delicate and, therefore, must be installed very carefully.

The essential elements of such heat supply units comprise:

(a) a heat exchanger in which heat is transferred to the fluid;

(b) a pump for propelling the heated fluid toward an apparatus to be heated by the fluid, hereinafter referred to as a utilization or heat consumption circuit. The pump also returns the heated fluid to the heat exchanger after the fluid gives up its heat to the heat consumption circuit; and (c) a feed reservoir; this reservoir is needed to store fluid which is not utilized in the heat consumption circuit itself and which must be available to fill the circuit if necessary, particularly when molds of different capacities are interchanged with each other.

Even when the heat supply unit is reduced to its essentials components allowing for the storage, the heating and the circulation of the fluid, the present state of the art requires that the heat supply unit be composed of distinct elements which are connected to one another and mounted in a factory so as to provide the user with a functional unit adapted to be connected to the heat consumption or utilization circuit.

The manufacture of these prior art heat supply units suffers from the following disadvantages:

(a) a variety of separate components is used;

(b) laborers having various specialties for the assembly of the unit (e.g., welding, brazing, pipe fitters, insulation, adjustment, etc.) must be used;

(c) the installation of the unit is time consuming and costly because the units are very large so as to compensate for the low efficiency of heat exchangers presently on the market; further the heat exchangers currently available have an energy loss which is proportional to the total surface of the consumption circuit and are difficult to adjust the temperature of as a result of the large heat inertia of the unit;

(d) the circulation pump has a low efficiency as a result of the length of the pump exhaust pipes; and (e) the installation of insulation which must be provided after assembly of each of the various elements is complex.

Applicant has solved some of these problems by integrating the heat exchanger and the circulation pump into a single unit in U.S. Pat. No. 4,232,733. However, that unit does not contain a reservoir for storing fluid, and therefore, the heat exchanger of this patent cannot be adapted to molds of different capacities.

Thus, there is a need for an improved heat supply unit does not suffer the disadvantages discussed above.

SUMMARY OF THE INVENTION

The present invention which overcomes the disadvantages mentioned above, comprises, in one embodiment, an apparatus for supplying a heated fluid to a heat consumption circuit. The apparatus comprises a heat exchange means for heating the fluid, means for pumping the heated fluid to the heat consumption circuit, and a reservoir for storing the fluid. The heat exchange means and the means for pumping are integral with each other so as to form a single assembly. In addition, the reservoir is mounted on this assembly and is adapted to supply fluid to the heat exchange means and the pumping means.

The assembly also comprises a rotatable drum for circulating the fluid within the assembly and a heating wall for heating the fluid. In addition, two means are provided for connecting the apparatus to the heat consumption circuit. The two connecting means comprise means for transmitting the fluid to the heat consumption circuit from the heat exchanger means, and a means for transmitting fluid from the heat consumption circuit back to the heat exchanger means. In one embodiment, the apparatus comprises only these two means for connecting the apparatus to the heat consumption circuit. In addition, in one embodiment, the reservoir is supported only by the heat exchanger and pump means.

The assembly further comprises a cylindrical housing encasing the heat exchanger means and the pumping means, and a cooling means, inside the cylindrical housing, for selectively cooling the fluid. The cylindrical housing in turn, comprises an exterior circular crown having electrical resistant elements therein adapted to receive electricity for heating the heating wall. The circular crown itself, comprises three sectors, each sector comprising electrical resistance elements. Each sector has a total resistance of approximately 1.6 kilowatts.

The apparatus also comprises a motor having a drive shaft adapted to rotate the rotatable drum, and a bearing around the drive shaft. In addition, the assembly comprises a flange and a thermal barrier attached to the flange for shielding the drive shaft from heat from the thermal resistance elements. The bearing comprises fins which also function as a thermal barrier to cool the drive shaft.

The rotatable drum also comprises at least one vent therein. This vent comprises a means for permitting internal circulation of the fluid in the heat exchange means and the pump means in the event of a sudden interruption of the circulation of the fluid in the consumption circuit.

The apparatus also comprises a temperature sensor positioned between the heating wall and the pump means, and a means for stopping the flow of electricity to the electrical resistance elements, in response to a predetermined temperature being measured by the temperature sensor.

The drum also comprises an outside longitudinal wall having at least one rib thereon, and an outside radial wall. In this embodiment, the assembly also comprises a wall between the pump means and the outside radial wall of the drum, and a passageway for passing fluid through the assembly. The passageway comprises a first portion, connecting the heat consumption circuit to the inside of the drum, a second portion inside the drum, a third portion between the outside longitudinal wall of the drum and the heating wall and connected to the second portion at one end thereof, a fourth portion between the outside radial wall of the drum and the wall between the pump means and the outside axial wall of the drum, and fifth portion, connecting the fourth portion to the pump means. In this embodiment, the at least one vent is positioned in the outer radial wall of the drum so as to connect the second and fourth portions of the passageways. In addition, the temperature sensor is positioned in the fourth portion of the passageway, and a cooling means is positioned inside the drum in the second portion of the passageway.

The apparatus can also comprise a degasifier means for degasifying fluid returning from the heat consumption circuit. In this embodiment, the pump means pumps fluid from the heat consumption circuit to the apparatus and the gas which has passed through the consumption circuit may have gas dissolved therein. In addition, a filter may be provided in the degasifying means for filtering out solid particles in the fluid.

A siphon can also be provided for connecting the reservoir to the degasifying means. One end of the siphon is connected generally to the upper portion of the degasifying means. In this way, the siphon can comprise a means for substantially insulating the fluid in the reservoir from the heated fluid in the degasifying means.

In another embodiment, the invention also comprises an apparatus for supplying a heated fluid to a heat consumption circuit. In this embodiment, the apparatus comprises a heat exchanger for heating the fluid, and a pump for pumping the heated fluid to the heat consumption circuit. The heat exchanger and the pump comprise one integral assembly. In this embodiment, the assembly comprises a rotatable drum and a wall spaced from and surrounding the drum. Also provided is a passageway connecting the drum to the space between the drum and the wall. The drum also comprises a plurality of vents spaced from the passageway for permitting fluid flow therethrough between the inside of the drum and the space between the drum and the wall.

In another embodiment of the invention, the invention also comprises an apparatus for supplying heated fluid to a heat consumption circuit. In this embodiment, the apparatus comprises an inlet for receiving fluid from the heat consumption circuit, a heat exchanger for heating the fluid from the inlet, an outlet for transmitting the heated fluid heated by the heat exchanger to the heat consumption circuit, a pump for pumping the heated fluid to the heat consumption circuit through the outlet, a reservoir for storing the liquid and adapted to feed liquid to the heat exchanger, and a siphon connecting the reservoir with the heat exchange circuit and inlet, whereby the siphon insulates the fluid stored in the reservoir from heat from the fluid from the inlet and the heat exchanger. This apparatus can also comprise a degasification means connected to the inlet and the heat exchanger for degasifying the liquid from the inlet. In this embodiment, the siphon connects the degasification means to the reservoir.

The invention also comprises a method for heating the liquid for use in a heat consumption circuit. The method comprises the steps of heating the liquid and pumping the heated liquid to the heat consumption circuit in an integral assembly including a heat exchanger having a drum and a pump, and sensing the temperature of the liquid in the integral assembly, and stopping the heating of the fluid in the heat exchanger in the event the temperature of the fluid reaches approximately the degradation temperature of the fluid. The method also comprises the step of circulating the fluid through at least two openings in the drum and cooling the fluid in the drum in the event the circulation of the fluid to the heat consumption circuit abruptly ceases. The method may also comprise the steps of receiving fluid from the heat consumption circuit, degasifying the fluid returning from the heat consumption circuit, and repeating the first two steps of the method. In addition, the method can also comprise storing fluid in a reservoir and transmitting this fluid in the reservoir to the integral assembly to be heated and pumped in the event that stored fluid is needed, and insulating the fluid in the reservoir from the heated fluid by means of a siphon connecting the degasification means and the reservoir.

Finally, the invention also comprises a method for manufacturing an assembly adapted to heat fluid and transfer the heated fluid to a heat consumption apparatus. The method comprises the step of manufacturing a circulation pump, a reservoir, and a heat exchanger, and forming an integral assembly of said circulation pump, said heat exchanger and said reservoir in a factory, wherein the assembly is adapted to be connected to said heat consumption circuit. The method further comprises the steps of manufacturing the degasification and filtration system, and integrally attaching the degasification and filtration system to the integral assembly in a factory. The method may also comprise the step of connecting the reservoir to the degasification system by siphon, whereby the siphon comprises a thermal barrier preventing heating of the fluid in the reservoir. The method may also comprise placing a temperature sensor in the integral assembly to measure the temperature of the fluid immediately after the fluid is heated by the heat exchanger, and boring a bypass in the heat exchanger so that in the event of a sudden interruption of the circulation of the fluid in the heat consumption circuit, fluid will circulate within the integral assembly via the bypass.

BRIEF DESCRIPTION OF THE DRAWINGS

One embodiment of the invention which is used to heat a plastic injection mold by means of fluid heated by electrical resistance elements will now be described with reference to the attached drawings, given by way of example only, in which.

DETAILED DESCRIPTION OF PREFERRED EMBODIMENTS

The present invention, overcomes these disadvantages by:

(a) integrating the heat exchanger and the circulation pump in a single block by reducing the size of the heat exchanger and by grouping these two elements so as to form a "thermoexchanger" which is the subject of Swiss Patent Application No. 9446/76 filed July 23, 1976, by the Applicants and granted on Oct. 15, 1977, as Swiss Pat. No. 596,530, which is hereby incorporated by reference, and U.S. Pat. No. 4,232,733, hereby incorporated by reference; and (b) connecting the feed reservoir to the exchanger/-pump block and positioning all of these elements in a single body comprising a compact assembly which is easily assembled in a factory and then brought on site for attachment to the heat consumption circuit.

The thermoexchanger of the present invention mentioned above has another advantage. Because it comprises a drum having spiral ribs adapted to assure the rapid circulation of the fluid as a function of the hottest points of the exchanger, these spiral ribs improve the exhaust conditions of the circulation pump situated immediately downstream from the drum, thereby increasing the pressure of its back flow.

By way of example, for the same heat consumption or utilization circuit, the circulation pump alone can provide a back flow pressure of 6.6 bars, while with the "overfeed" due to the rotation of the spiral drum, this pressure can reach 7.2 bars of pressure. This increase in pressure of almost 20% accelerates the circulation of the fluid and makes it possible to reduce the temperature that must be attained by the fluid in the heat exchanger for a predetermined pressure inside the heat consumption circuit.

The assembly described above solves the problems of the prior art by using a basic heat supply unit having only the minimum number of necessary elements. The invention, however, can be extended to those situations where one wishes to assure the complementary functions of degasification and filtration of fluid exiting from the heat consumption circuit so as to avoid cavitation of the circulation pump as well as clogging of the circuit. This can be accomplished in the factory by integrating equipment performing these degasification and filtration functions described above with the heat exchanger/pump/reservoir already in a single unit.

However, such a complex and compact assembly produced in a factory presents a certain number of additional problems which are solved by two additional embodiments of the invention.

One problem that arises due to the compact size of the assembly and the small amount of fluid used is that a maximum quantity of heat is continually transferred to this small quantity of heat exchange fluid. As a result, the fluid attains a temperature which is only slightly below its degradation temperature.

It is thus essential to closely monitor the temperature of the fluid to avoid degradations of the fluid due to excessive temperatures and to avoid any overheating of the fluid.

Accordingly, in one additional embodiment, a sensor is provided to measure the temperature of the fluid in a chamber receiving the fluid immediately after the fluid's passage over the length of a heating surface. In this chamber the fluid is stirred up substantially, such that the difference between the temperature of the fluid in this chamber and the temperature of the fluid in contact with the heating surface of the heating surface is negligible. Thus, the sensor in this chamber can obtain an accurate measure of the maximum temperature of the fluid heated by the heating surface. Furthermore, the heat exchanger/pump assembly is provided with an internal bypass to assure the internal circulation of the fluid in assembly and through the bypass in the event there is a sudden interruption of the general circulation in the consumption circuit. This resulting residual safety circulation prevents the fluid from becoming elevated to a critical temperature (which would occur if the fluid remained in static contact with the heating surface), by circulating a greater quantity of fluid across the heating surface.

The compact size of the assembly also causes a second problem. This second problem arises for the following reasons. When the assembly is compact, the volume of heat exchange fluid in the heating circuit is reduced to a considerable extent, and the energy losses are reduced by the same proportion. This is desirable. However, as a result of this compactness, the tube connnecting the exchanger to the reservoir is of small diameter, thereby increasing the time for filling of the heat consumption circuit during the installation of a new mold. Conventional methods of constructing the unit do not suffer this problem because in conventional methods, it is preferable that the reservoir be in communication with the exchanger through a large diameter tube (e.g., 20 mm) to allow for a rapid filling of the circuit and the assembly during the filling and the placement of a new mold. However, due to the diameter of the tube, a natural circulation can occur under conditions which will heat the fluid contained in the reservoir. As a result, fluid in the heat exchanger loses its heat to the fluid in the reservoir. Unfortunately, to solve this problem the volume of fluid in the reservoir cannot be reduced. This volume is dictated by the fluid capacities of various utilization or heat consumption circuits, particularly molds, whose substantially complicated imprints must be irrigated by internal pipes having a substantially large volume.

The above considerations generally lead some heat supply unit manufacturers to use tubes having a small diameter to connect the exchanger and the reservoir. This arrangement increases the time during which the presses are immobilized for the changing of the molds whose filling is thus slowed.

The present invention, on the other hand, does not reduce the diameter or volume of the connection between the heat exchanger and the reservoir to complement the reduction of the volume of the heating circuit. Rather, the present invention uses a connection tube between the reservoir and th exchanger that had a large volume, e.g., 20 mm in diameter, but creates a simple "thermal" barrier between the fluid circulating in the heat exchanger and the stationary fluid in the reservoir.

To create this thermal barrier, the invention further comprises, according to one alternative embodiment, a degasification chamber, attached to the exchanger/-pump assembly and a pipe having a large cross-section in the shape of a siphon to connect the degasification chamber to the reservoir. The use of a siphon prevents an increase in temperature of the fluid stored in reservoir. As a result, the fluid in the reservoir is thermally "insulated" from the hot fluid in circulation in the heat exchanger, while at the same time the fluid in the reservoir remains in perfect circulatory contact with the heat exchanger. There is thus little problem of oxidation of the fluid stored in the reservoir even though it is in communication with the atmosphere, when the siphon connects the reservoir to the degasifier in the heat exchanger/pump/degasification chamber/reservoir unit.

By way of example, along the length of a tube having a diameter of 20 mm in the shape of a siphon, the temperature drops from 250° to 30° in approximately 10 centimeters along the length thereof, between the heat exchanger and the reservoir, representing a spectacular temperature gradiant.

Figure 1:
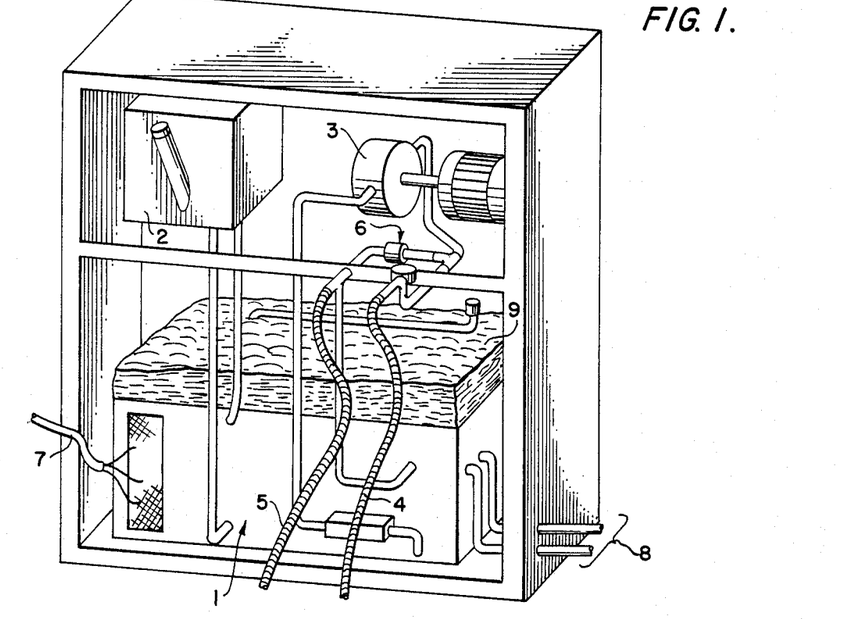
FIG. 1 illustrates a conventional heat supply unit.

FIG. 1 illustrates a conventional heat exchanger fluid heating plant, also referred to as a heat exchange fluid heating unit or assembly. The assembly comprises essentially: a heat exchanger 1; a reservoir container 2; a circulation pump 3; and conduits such as 4 and 5.

In the example shown, exchanger 1 is positioned beneath reservoir 2 which feeds fluid to exchanger 1 by gravity. Circulation pump 3 is positioned in the upper portion of the apparatus. After being heated in exchanger 1, the heat exchange fluid is pumped by pump 3 to a heat consumption circuit through conduit 4 and returns to the exchanger through conduit 5. All these elements are connected by several connection pipes, and particularly by a bypass 6.

Exchanger 1 has a large volume because it comprises heating means including electrical resistance elements 7 contained in sealed sheaths which provide heat to the fluid in which they are immersed, and cooling means 8 for cooling the fluid when the consumption circuit cycle so requires.

Reservoir 2 guarantees that the entire circuit can be filled with a sufficient amount of heat exchange fluid. The reservoir also serves to store excess fluid when the consumption circuit used has a low capacity.

A bypass 6 is connected between pipes 4 and 5. Bypass 6 diverts the circulation of the fluid away from the consumption circuit when the consumption circuit is obstructed accidentally.

The assembly requires a substantial quantity of fluid to cover the sealed sheaths containing the electrical heating resistance elements 7 within the heat exchanger 1, and to cover cooling circuit 8, as well as to fill numerous connection pipes. Another disadvantage of this arrangement is that these numerous connection pipes pose heating and power regulation problems when it becomes necessary to rapidly vary the temperature of the fluid.

In addition, the numerous connections increase the danger of leakage and require substantial assembly time. Also, when the assembly is assembled and delivered in a single structure, it is very cumbersome. As a result, the energy losses which occur through heat exchanger 1 are substantial because the contact surface of this assembly with the exterior is substantial. This can be remedied by insulation 9 but it is expensive because it requires supplemental labor.

Although the above description is brief, it illustrates by way of example, the principal problems involved with conventional heat supply apparatus. To summarize, some of these problems include the use of disparate elements in one device; overall cumbersomeness; heat loss; the necessity of delicate regulation of the heat exchange fluid due to substantial heat inertia; low efficiency of the circulation pump; and loss of time during installation.

The present invention which overcomes these problems of traditional heat supply units, will now be described.

Figure 2:
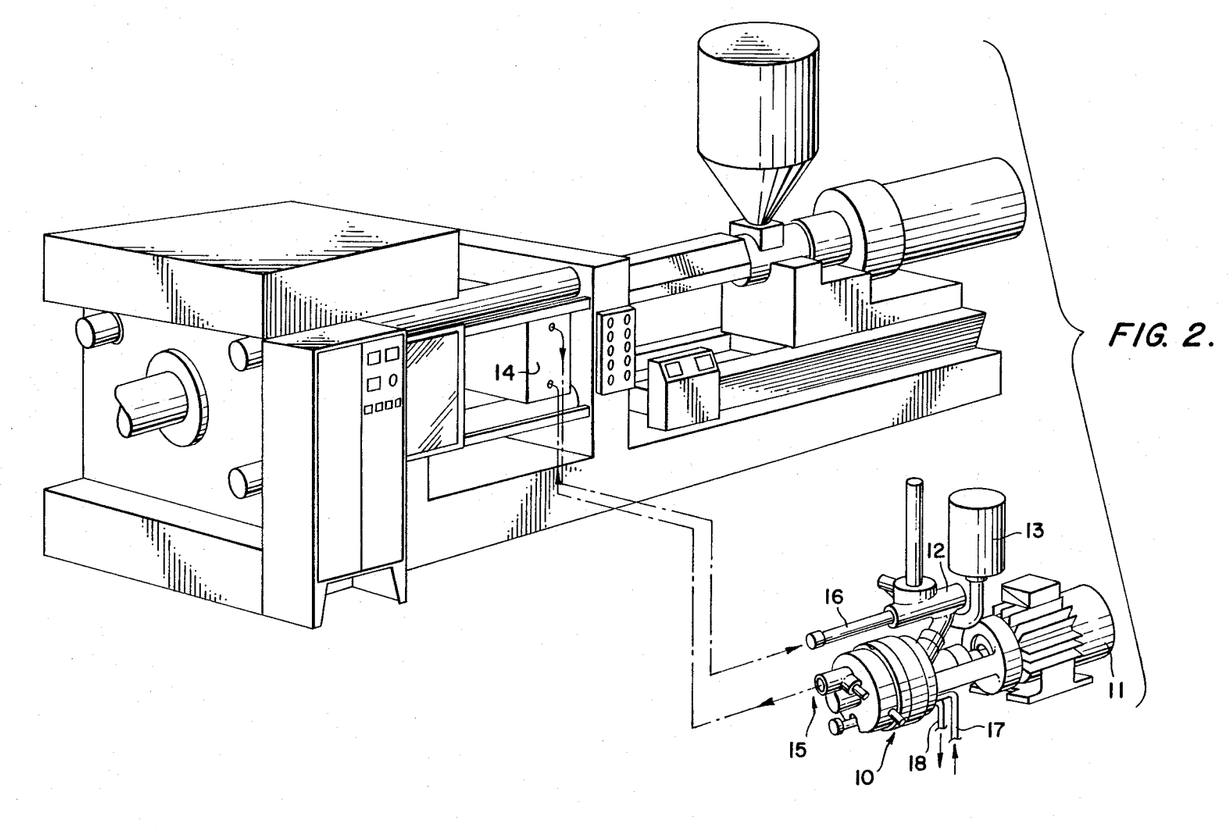
FIG. 2 is a perspective view illustrating a compact unit according to the present invention, installed so as to heat a thermoplastic resin injection press mold.

As may be seen in FIG. 2, at the lower right hand portion thereof, a compact heat supply unit or assembly comprising an integral heat exchanger/pump assembly 10 is illustrated on an enlarged scale in the circle illustrated therein. The unit also comprises an electric drive motor 11, a degasification apparatus 12, and a feed reservoir 13. The heat exchanger can be entirely machined and mounted in the shop; it suffices to equip it with a motor and to build a body for the assembly in order to have a unit which can be used on the site of the heat consumption circuit. In one embodiment, the heat consumption circuit comprises a mold 14 mounted on a plastic injection mold apparatus.

Even though molds comprise two portions, each portion fed by heat exchange fluid, for purposes of simplicity, only one heat consumption circuit has been shown in the drawings. Of course, it is within the scope of the invention to use two heat exchanger/pump assemblies which comprise a double beating circuit comprising two parallel sub-circuits, each connected to one of the two mold portions.

Because the customer receives the heat supply assembly in a prefabricated condition, the connection of the heat supply assembly to the heat consumption circuit requires only two connections 15 and 16 assuring the circulation of the heat exchange fluid. The inlet comprises tube 16, which transmits fluid from the heat consumption circuit to assembly 10, and the outlet of the assembly 10 comprises tube 15, which transmits fluid from assembly 10 to the heat consumption circuit. In addition, two connections 17 and 18 can be provided to connect the heat exchange fluid to a cooling circuit. Alternatively, four connections between assembly 10 and the heat consumption circuit can be used.

Figure 3:
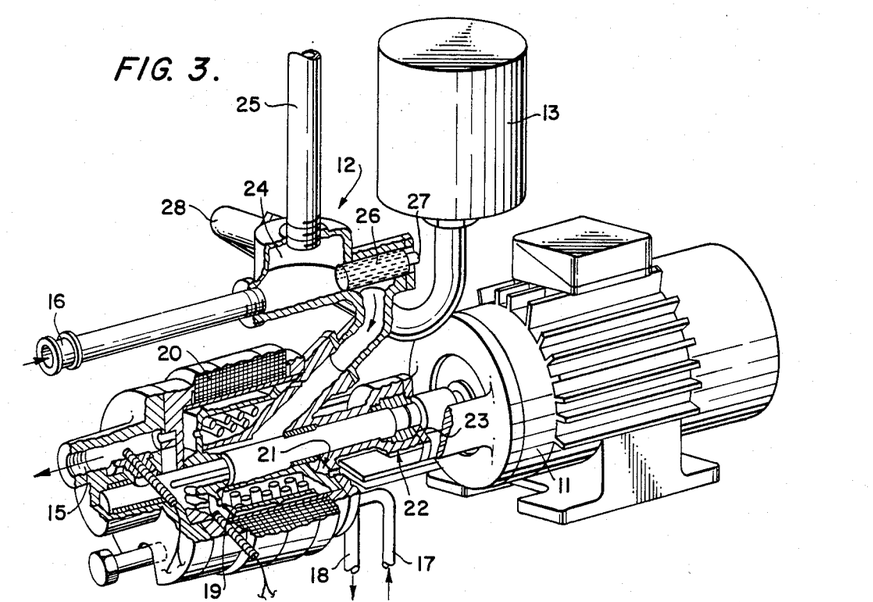
FIG. 3 is a perspective view of the compact unit of FIG. 2, having a degasifier and the heat pump exchanger shown in partial cross-section.

FIG. 3 illustrates the compactness of the exchanger/pump assembly. In effect, as can be seen in the cross-sectional view seen in FIG. 3, the fluid circulates inside a cylindrical envelope of preferably approximately 125 mm in diameter and approximately 110 mm in length, inside of which coils 19 of the cooling circuit are provided. The fluid is heated by electrical resistance elements embedded in an exterior circular crown 20 of exchanger 10. Crown 20 has a hatched cross-section in the shape of a grid, and it is this grid that comprises the resistance elements. Circular heating crown 20 comprises three equal sectors, each sector having a total resistance of approximately 1.6 Kw. The overall assembly of the three sectors, thus has a heating power of approximately 5 Kw.

Given the proximity of the heating resistance elements to the drive shaft motor 11, two improvements can be made to the apparatus to avoid a heating of the drive shaft of motor 11. First, a chamber 21 is provided as a thermal barrier in the flange of the pump/exchanger on the drive side thereof. Furthermore, a bearing 22 which is closest to the motor is provided with fins and is thus cooled by the blowing of the electric motor. By virtue of these two features, sealing fitting 23 of the shaft never exceeds 130° centigrade.

The heat exchanger/pump of the present invention whose operation will be described with reference to FIG. 4 below, occupies a volume which is approximately eight times less than a conventional heat exchanger and pump. However, before discussing the operation of the heat exchanger and pump, the structure and function of the degasifier illustrated in FIG. 5 will be explained.

Figure 5:
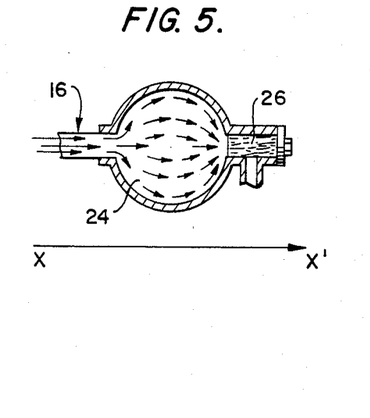
FIG. 5 is a horizontal cross-sectional view along x-x' of the degasification apparatus illustrated in FIG. 3.

FIG. 5 illustrates the operation of degasifier 12 which is mounted directly on heat exchanger/pump assembly 10. The fluid which in one embodiment can comprise oil, returns from the heat consumption circuit, arrives through inlet tube 16 and penetrates chmber 24 of the degasifier chamber 24 has a substantially larger cross-sectional area than tube 16. As a result, the velocity of the fluid is reduced as a result of this increase in the cross-sectional area at the outlet of tube 16. This reduction in the velocity of the fluid is schematically illustrated in FIG. 5, and permits the fluid to slightly depressurize as a result of the loss from the fluid of the gas or oil vapor which were dissolved in the fluid due to the circulation of the fluid created by the circulation pump. This gas or the oil vapor is released upwardly and evacuated to the atmosphere by its passage through vertical tube 125 which is screwed onto the upper portion of degasifier 12.

After resting in chamber 24, the fluid leaves chamber 24 and travels towards exchanger/pump assembly 10 by travelling in the direction shown by the arrows in FIG. 5 through a filter 26. This filter is mounted directly at the lower portion of degasifier 12. The filter retains the solid particles and particularly impurities introduced during filling. This filter can be disassembled by unscrewing cap 27.

FIG. 3 illustrates a connection between degasifier 12 and reservoir 13 which forms a thermal barrier. This thermal barrier makes it possible to maintain a connection of substantial cross-section between the reservoir and the degasifier while at the same time preventing a draining of the circulation pump during filling of a new heat consumption circuit from fluid stored in reservoir 13.

At the upper portion of chamber 24 of the degasifier a lateral orifice, not shown in the cross-section, allows for the connection of chamber 24 with a tube 28, which in turn, is connected to reservoir 13. This tube is horizontal initially as it leaves chamber 24, then inclines downwardly, and then is ultimately bent upwardly in the vertical direction when it is connected beneath reservoir 13. As is shown in the diagram of FIG. 6, this tube is in the form of a siphon.

It is known that in a vertically disposed reservoir containing a hot fluid, even in the absence of any agitation, there are movements within the fluid in the reservoir which are due to an unequal cooling of the hot fluid. These movements cause a stratification of the fluid into horizontal layers of the same temperature, the hottest fluid being on top with the temperature of each stratum decreasing progressively towards the bottom, and the coldest fluid being positioned on the bottom. It is for this reason that water is removed from the top in water heaters.

Figure 6:
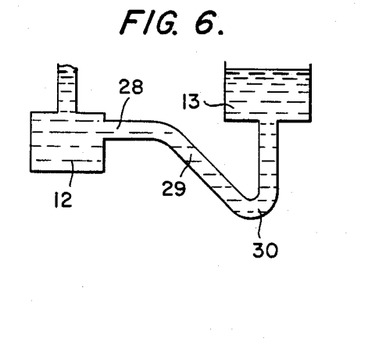
FIG. 6 is a schematic diagram of a vertical crosssection illustrating the operation of the siphon seen in FIG. 3.

FIG. 6 illustrates an application of this phenomenon in a tube having the shape of a siphon which places degasifier 12 in communication with reservoir 13. Tube 28, 29, 30 has a substantial cross-section and can be considered as a vertical reservoir. In this reservoir, the hot fluid in communication with degasifier 12 is located at the upper portion 29 and the cold fluid, in communication with reservoir 13, is located at the lower portion 30. The stratification of the fluid by horizontal stratum decreasing in temperature in the downward direction has already taken place and no natural stirring movement of the fluid occurs. Furthermore, the liquid flux traversing the bottom of chamber 24 of degasifier 12 cannot result in parasitic stirring of fluid in tube 28, 29, 30 because tube 28 is connected to the upper portion of degasifier 12 where the flow of the fluid is the slowest and the direction of the connection is perpendicular to this flow.

Figure 4:
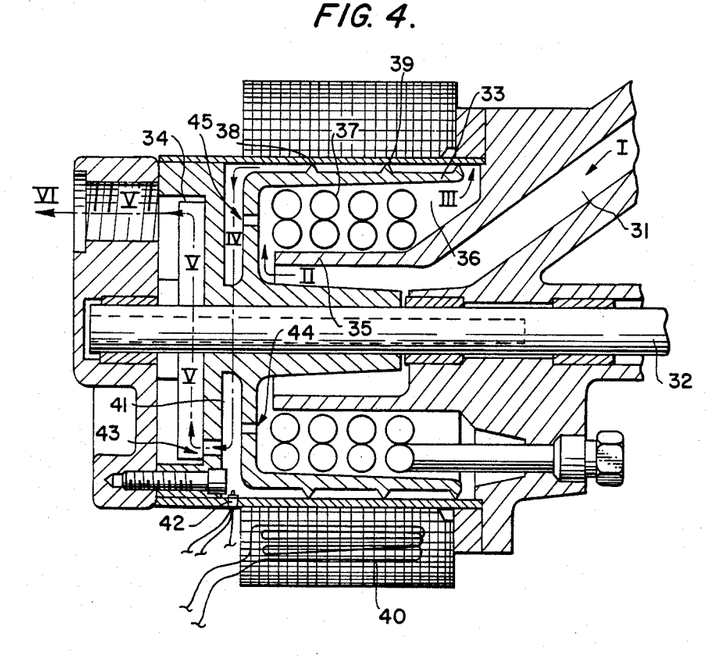
FIG. 4 is an axial cross-sectional view of the heat exchanger and pump seen in FIG. 3.

FIG. 4 illustrates two improvements in the pump/exchanger assembly described in Swiss Pat. No. 596,530.

The function of the exchanger/pump assembly or unit will be briefly reviewed, as it is disclosed in the above mentioned patent, before describing the improvements which are part of the present invention.

Fluid which has given up its heat to the consumption circuit leaves the heat consumption circuit through orifice or inlet I in the direction of the arrow in orifice I, and flows through canal 31 where the fluid then circulates parallel to a drive axis 32 which is common to a rotating drum 33 and pump 34. The fluid then travels around cylindrical baffle 35 (arrow II), penetrates the interior of drum 33 so as to enter chamber 36, and passes through tubular cooling bundle 37. Drum 33 rotates rapidly and comprises ribs 38 positioned helically at its exterior cylindrical surface. These ribs exhaust the fluid from chamber 36 inside drum 33 (arrow III) and drive the fluid rapidly along the length of wall 39 and between the outside longitudinal wall of drum 33 and wal 39. Wall 39 is heated by electrical resistance elements 40 which are positioned over the entire periphery of wall 39.

The space between ribs 38 of drum 33 and the interior of wall 39 is approximately 0.1 mm. The fluid is driven very rapidly and does not remain in contact with this wall which is the hottest portion of the apparatus. There is, therefore, no danger of carbonization of the fluid due to excessive heating. After its passage over heating wall 39, the fluid enters circular chamber 41 (arrow IV) between a radial outside wall of drum 33 and a wall between drum 33 and pump 34. A temperature sensor 42 is positioned in chamber 41. The fluid then at travels to 43 into the helix of drive pump 34, and traverses the pump along a trajectory not shown in cross-section (illustrated by the arrow in dashed lines V) to be directed towards the heat consumption circuit through the orifice identified by arrow VI. In other words, the fluid travels through a passageway in assembly 10 having six portions I-VI, which connect the inlet to the outlet of assembly 10.

According to a first improvement of this heat exchanger/pump assembly, the assembly comprises a means for cutting off the electricity feeding resistance elements 40 when the temperature measured by sensor 42 exceeds a predetermined temperature so as to prevent overheating and degradation of the fluid, and for reestablishing the flow of electricity to resistance elements 40 as soon as the temperature of the fluid or oil is brought below this critical temperature. It is easier to measure the temperature of the fluid in chamber 41, than when the fluid is in contact with hottest wall 39 because the agitation of the fluid due to the rotation of drum 33 as well as the sweeping of the fluid along the length of wall 39 are very substantial. In addition, measurement of the temperature of the fluid in chamber 41 gives an accurate measurement of the fluid in contact with wall 39 because the difference between the temperatures of the fluid in these two zones is negligible.

A second sensor is also provided to function as a security valve in the event that sensor 42 fails. This second sensor can operate at a temperature slightly higher than that at which sensor 42 can operate.

In a second improvement of the heat exchanger/pump assembly described in the aforementioned Swiss patent, the bottom of drum 33 is provided with vents shown as 44 and 45. More specifically, vents 44 and 45 are provided in the radial outside wall of drum 33 and connect chamber 36 with chamber 41. Furthermore, vents 44 and 45 are spaced from the other opening in drum 33 shown at III. These vents 44, 45 are adapted to assure an internal circulation of the fluid in the exchanger if the flow is suddenly interrupted in the heat consumption or utilization circuit. In this case, even though centrifugal pump 34 no longer pumps, an internal circulation occurs by virtue by helicoidal ribs or channels 38 of rotating drum 33 which act as a pump. The fluid forced along wall 39 arrives in chamber 41, traverses vents 44 and 45, is cooled on tubular bundles 37, and passes through chamber 36 before being again driven by ribs or channels 38 of drum 33. Carbonization of the fluid, which would have been inevitable when the circulation in the heat consumption circuit stopped, is prevented because the quantity of fluid in contact with the hot wall is very small due to the combined action of vents 44, 45 and ribs 38. In other words, vents 44 and 45 act as an interior bypass.

By virtue of this second improvement, the exterior bypass utilized in conventional installations is not needed. Furthermore, in normal operation, vents 44 and 45 bored in drum 33 only slightly disturb the exhaust conditions of pump 34.

Although it has been noted that a drive-type pump 34 offers the best operating characteristics, it is within the scope of the invention to use any type of pump, including a centrifugal pump.

Figure 7:
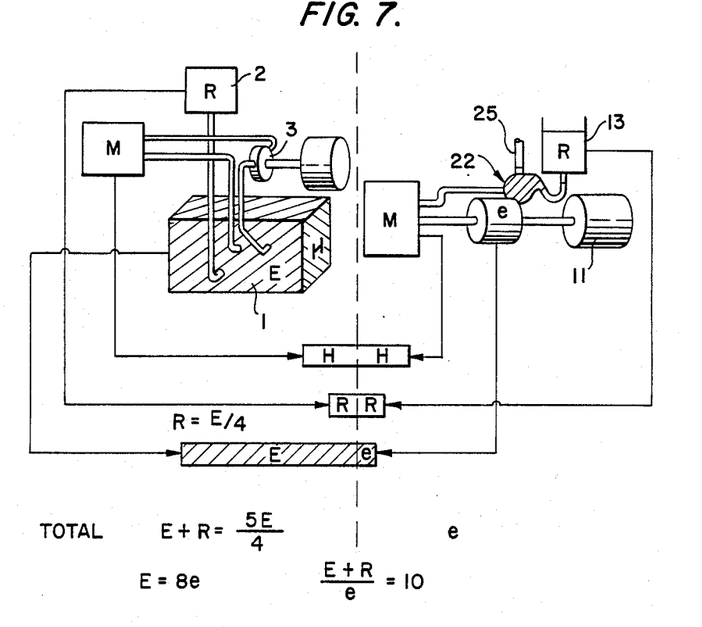
FIG. 7 is a schematic diagram illustrating the volumes of fluid respectively utilized in the various portions of a conventional circuit (FIG. 1) and of a circuit according to the present invention (FIG. 2).

So as to emphasize the essential advantages of the invention, a conventional installation is illustrated in the left hand portion of FIG. 7, which regulates the temperature of an injection mold M, and an installation according to the present invention is shown in the right hand portion of FIG. 7, which regulates a tool having the same capacity M, as the mold shown in the left hand portion of FIG. 7.

The volumes of the different parts of the circuit, i.e, mold M, exchanger, pump and channels E, and reservoir R, are shown on two diagrams in dashed lines on both sides of the median plane of the Figure. On the left, the volumes corresponding to the conventional installation are shown, while on the right the volumes of an installation according to the present invention are shown.

The zones where the heat exchange fluid is hot and is in danger of losing its heat are hatched. In particular, it can be seen that the fluid contained in the reservoir connected according to the invention is not hot and is thus non-hatched.

Volumes M and R which can be considered tributaries of the consumption circuits have the same values in the two examples.

It is clear to those skilled in the art that the essential improvement of the present invention is due to the compact construction of the pump/exchanger assembly and to the high efficiency of the pump/exchanger whose reduction in volume with respect to a conventional heat exchanger is in the ratio of 8 to 1.

Furthermore, by the proper positioning an available fluid or oil reservoir and by the proper connection of this reservoir to the pump/exchanger assembly, the reservoir remains cold and allows a further reduction in heat loss. As a result, the volume of hot fluid is reduced by a factor of ten (i.e. 10:1) compared to conventional installations.

Although the invention has now been described with respect to particular means, embodiments and materials, it is understood that the invention is not limited to the particulars disclosed and extends to all equivalents falling within the scope of the claims.

What is claimed is:

1. An apparatus for supplying a heated fluid to a heat consumption circuit, wherein said apparatus comprises:
   (a) a heat exchanger means for heating said fluid;
   (b) means for pumping said heated fluid to said heat consumption circuit, wherein said pump means is integral with said heat exchanger means and forms a single integral assembly therewith; and
   (c) a reservoir for storing said fluid, wherein said reservoir is mounted on said assembly and is adapted to supply said fluid to said heat exchanger means and said pumping means, wherein said assembly comprises:
   (i) a rotatable drum for circulating said fluid within said assembly;
   (ii) a heating wall for heating said fluid;
   (iii) a cylindrical housing, encasing said heat exchanger means and said pump means, wherein said cylindrical housing comprises an exterior circular crown having electrical resistance elements therein for heating said heating wall; and
   (iv) cooling means, inside said cylindrical housing for selectively cooling said fluid.

2. The apparatus defined by claim 1 further comprising two means for connecting said apparatus to said heat consumption circuit.

3. The apparatus defined by claim 2 wherein said apparatus further comprises only two means for connecting said apparatus to said heat consumption circuit.

4. The apparatus defined by claim 3 wherein one of said connecting means comprises a means for transmitting fluid to said heat consumption circuit from said heat exchanger means, and the other connecting means comprises means for transmitting fluid from said heat consumption circuit to said heat exchanger means.

5. The apparatus defined by claim 4 wherein said reservoir is supported only by said heat exchanger and pump means.

6. The apparatus defined by claim 1 wherein said circular crown comprises three sectors, each sector comprising electrical resistance elements having a total resistance of approximately 1.6 Kw.

7. The apparatus defined by claim 1 wherein gas is dissolved in said fluid and wherein said pump means pumps fluid from said heat consumption circuit to said apparatus, wherein said apparatus further comprises:
   a degasifier means for degasifying said fluid returning from said heat consumption circuit.

8. The apparatus defined by claim 7 further comprising a filter in said degasifying means for filtering out solid particles in said fluid.

9. The apparatus defined by claim 7 further comprising a siphon, connecting said reservoir to said degasification means.

10. The apparatus defined by claim 9 wherein one end of said siphon is connected generally to the upper portion of said degasification means, and wherein said siphon comprises means for substantially insulating said fluid in said reservoir from heat from said heated fluid in said degasification means.

11. The apparatus defined by claim 1 wherein said apparatus further comprises:
   (d) an inlet for receiving fluid from said heat consumption circuit;
   (e) an outlet for transmitting heated fluid heated by said heat exchanger to said heat consumption circuit;
   (f) said means for pumping pumps said heated fluid to said heat consumption circuit through said outlet; and,
   (g) a siphon connecting said reservoir with said heat exchanger and said inlet, whereby said siphon insulates said fluid stored in said reservoir from the heat of said fluid in said inlet and said heat exchanger.

12. The apparatus defined by claim 11 further comprising a degasification means connected to said inlet and said heat exchanger for degasifying said fluid from said inlet, wherein said siphon connects said degasification means to said reservoir.

13. The apparatus defined by claim 1, wherein said reservoir is mounted on and above said assembly, and wherein said siphon comprises a tube comprising first, second and third sections, wherein said first section extends substantially horizontally from said assembly, wherein said second section extends from said first section in a downward direction, and wherein said third section extends upwardly from said second section to said reservoir.

14. The apparatus defined by claim 11, wherein said reservoir is mounted on said heat exchanger and extends above said heat exchanger, and wherein said siphon comprises first, second and third sections, wherein one end of said first section is connected to said heat exchanger, wherein the other end of first section is connected to said second section, wherein said second section etends downwardly from said first section, and wherein said third section extends upwardly from said second section to said reservoir.

15. An apparatus for supplying a heated fluid to a heat consumption circuit, wherein said apparatus comprises:
   (a) a heat exchanger means for heating said fluid;
   (b) pump means for pumping said heated fluid to said heat consumption circuit, wherein said pump means is integral with said heat exchanger means and forms a single integral assembly therewith;
   (c) a reservoir for storing said fluid wherein said reservoir is mounted on said assembly and is adapted to supply said fluid to said heat exchanger means and said pumping means, wherein said assembly comprises:
      (i) a rotatable drum for circulating said fluid within said assembly;
      (ii) a heating wall for heating said fluid;
      (iii) a cylindrical housing, encasing said heat exchanger means and said pump means, wherein said cylindrical housing comprises an exterior circular crown having electrical resistance elements therein for heating said heating wall; and
      (iv) cooling means, inside said cylindrical housing for selectively cooling said fluid; and
   (d) a motor having a drive shaft adapted to rotate said rotatable drum, and a bearing having fins thereon around said shaft, wherein said assembly comprises a flange and a thermal barrier attached thereto for shielding said drive shaft from heat from said thermal resistance elements.

16. An apparatus for supplying a heated fluid to a heat consumption circuit, wherein said apparatus comprises:
   (a) a heat exchanger means for heating said fluid;
   (b) pump means for pumping said heated fluid to said heat consumption circuit, wherein said pump means is integral with said heat exchanger means and forms a single integral assembly therewith; and
   (c) a reservoir for storing said fluid, wherein said reservoir is mounted on said assembly and is adapted to supply said fluid to said heat exchanger means and said pumping means, wherein said assembly comprises:
      (i) a rotatable drum for circulating said fluid within said assembly, said rotatable drum comprising at least one vent therein, wherein said at least one vent comprises means for permitting internal circulation of said fluid in said heat exchanger and pump means in the event of a sudden interruption of the circulation of said fluid in said consumption circuit;
      (ii) a heating wall for heating said fluid;
      (iii) a cylindrical housing, encasing said heat exchanger means and said pump means, wherein said cylindrical housing comprises an exterior circular crown having electrical resistance elements therein for heating said heating wall; and
      (iv) cooling means, inside said cylindrical housing for selectively cooling said fluid.

17. The apparatus defined by claim 16 wherein said electrical resistance elements are adapted to receive electricity, wherein said apparatus further comprises: a temperature sensor positioned between said heating wall and said pump means, and means for stopping the flow of electricity to said electrical resistance elements in response to a predetermined temperature being measured by said temperature sensor.

18. The apparatus define by claim 16 wherein said drum comprises:
   (i) an outside longitudinal wall having at least one rib thereon; and
   (ii) an outside radial wall, wherein said assembly further comprises:
   (i) a wall between said pump means and said outside axial wall of said drum; and
   (ii) a passageway for said fluid having:
      a first portion connecting said heat consumption circuit to the inside of said drum; a second portion inside said drum;
      a third portion between the outside longitudinal wall of said drum and said heating wall and connected to said second portion at one end thereof;
      a fourth portion between the outside radial wall of said drum and said wall between said pump means and said outside axial wall of said drum; and
      a fifth portion, connecting said fourth portion and said pump means, wherein said at least one vent is positioned in said outer radial wall of said drum so as to connect said second and fourth portions of said passageway.

19. The apparatus defined by claim 18 wherein said temperature sensor is positioned in said fourth portion of said passageway.

20. The apparatus defined by claim 19 wherein said cooling means is positioned inside said drum in said second portion of said passageway.

21. An apparatus for supplying a heated fluid to a heat consumption circuit, wherein said apparatus comprises:
(a) a heat exchanger for heating said fluid;
(b) a pump for pumping said heated fluid to said heat consumption circuit, wherein said heat exchanger and said pump comprise one integral assembly, wherein said assembly comprises a rotatable drum, and a wall spaced therefrom and surrounding said drum, said apparatus further comprises a passageway connecting said drum to said space between said drum and said wall, wherein said drum comprises a plurality of vents spaced from said passageway for permitting fluid to flow therethrough between the inside of said drum and said space between said drum and said wall, wherein said drum further comprises cooling elements inside said drum, wherein said passageway passes through said drum whereby said passageway leads said fluid from said space between said drum and said wall to said cooling elements inside said drum when circulation of fluid in said heat consumption circuit is interrupted.

* * * * *

UNITED STATES PATENT AND TRADEMARK OFFICE
CERTIFICATE OF CORRECTION

PATENT NO.  : 4,733,721

DATED       : March 29, 1988

INVENTOR(S) : Tadeusz PIOTROWSKI et al.

It is certified that error appears in the above-identified patent and that said Letters Patent is hereby corrected as shown below:

Title page, item [57].

In the Abstract, line 8, delete "," after "exchanger".

At column 1, line 12, delete "," after "molds".

At column 1, line 38, change "essentials" to ---essential---.

At column 1, line 54, insert ---,--- after "further" and before "the".

At column 2, line 4, insert ---which--- before "does".

At column 2, line 7, insert ---,--- after "invention" and before "which".

At column 2, line 36, insert ---,--- after "housing" and before "in".

At column 2, line 39, delete "," after "itself" and before "comprises".

At column 4, line 62, change "cross section" to ---cross-section---.

At column 5, line 3, delete "," after "invention" and before "overcomes".

At column 6, line 57, change "th" to ---the---.

At column 7, line 63, delete "," after "example" and before "the".

At column 8, line 3, insert ---,--- after "invention" and before "which".

At column 8, line 21, delete "," after "simplicity" and before "only".

At column 8, line 53, delete "," after "sectors" and before "thus".

UNITED STATES PATENT AND TRADEMARK OFFICE
CERTIFICATE OF CORRECTION

PATENT NO. : 4,733,721

DATED : March 29, 1988

INVENTOR(S) : Tadeusz PIOTROWSKI et al.

It is certified that error appears in the above-identified patent and that said Letters Patent is hereby corrected as shown below:

At column 8, line 61, insert ---,--- after "22" and before "which".

At column 8, line 61, insert ---,--- after "motor" and before "is".

At column 8, line 65, insert ---,--- after "invention".

At column 9, line 5, insert ---,--- after "12" and before "which".

At column 9, line 7, insert ---,--- after "fluid" and before "which".

At column 9, line 9, change "chmber" to ---chamber---.

At column 9, line 10, insert ---.--- after "degasifier" and before "Chamber".

At column 9, line 10, change "chamber" to ---Chamber---.

At column 9, line 39, insert ---,--- after "degasifier".

At column 9, line 42, delete "," after "turn" and before "is".

At column 9, line 64, insert ---,--- after "fluid" and before "in".

At column 9, line 65, insert ---,--- after "29" and before "and".

At column 10, line 29, change "wal" to ---wall---.

At column 10, line 30, insert ---,--- after "40".

UNITED STATES PATENT AND TRADEMARK OFFICE
CERTIFICATE OF CORRECTION

PATENT NO. : 4,733,721

DATED : March 29, 1988

INVENTOR(S) : Tadeusz PIOTROWSKI et al.

It is certified that error appears in the above-identified patent and that said Letters Patent is hereby corrected as shown below:

At column 10, line 42, insert ---41--- after "at" and before "travels".

At column 11, line 60, insert ---,--- after "R" and before "which".

At column 11, line 61, insert ---,--- after "circuits" and before "have".

At column 12, line 1, insert ---of--- after "positioning" and before "an".

At column 12, line 2, insert ---,--- after "reservoir" and before "and".

At column 12, line 48, i.e., at claim 5, line 1, change "4" to ---1---.

At column 13, line 40, i.e., at claim 14, line 8, change "etends" to ---extends---.

Signed and Sealed this

Twenty-fourth Day of July, 1990

Attest:

HARRY F. MANBECK, JR.

Attesting Officer      Commissioner of Patents and Trademarks